Aug. 8, 1939.  C. F. REYNOLDS  2,168,539
CHAIN REPAIR LINK
Filed Aug. 26, 1938
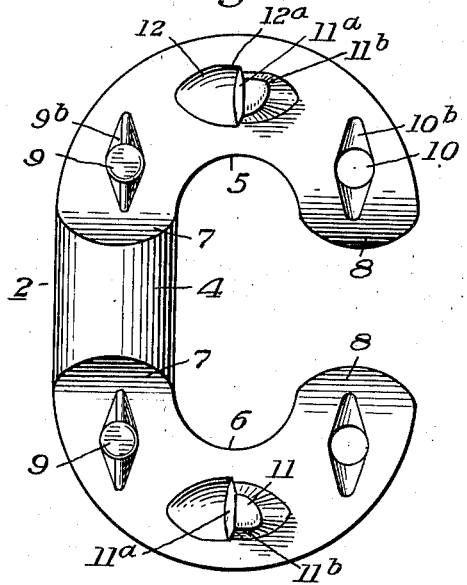
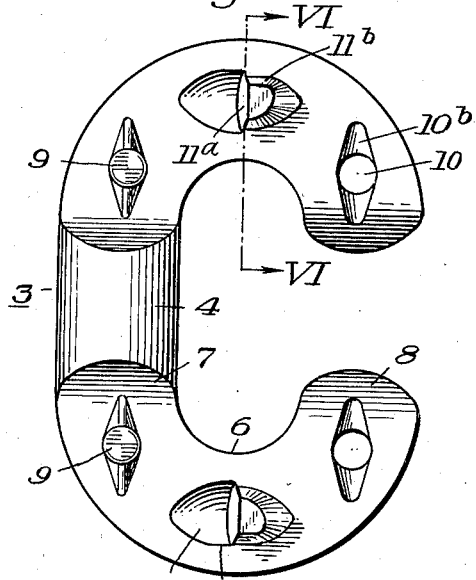
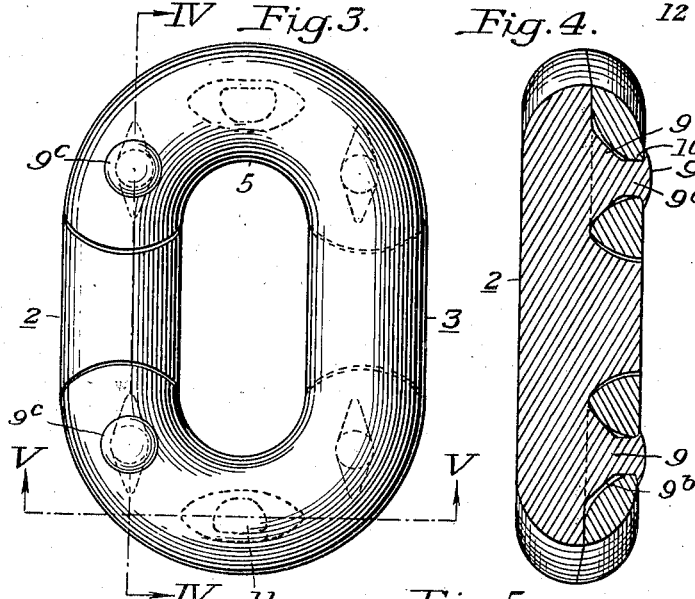
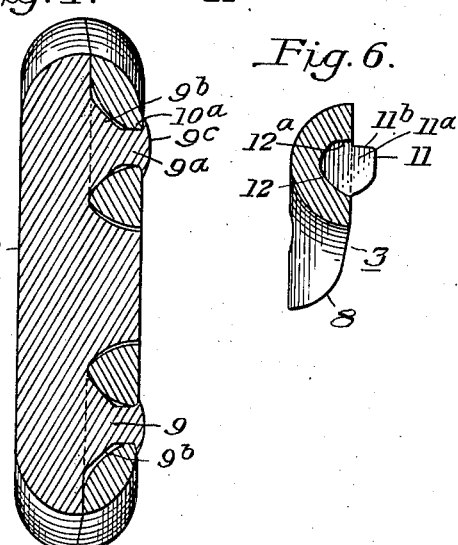
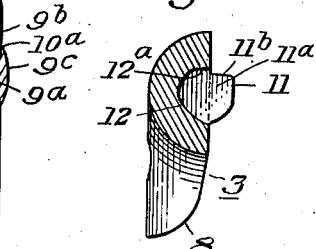
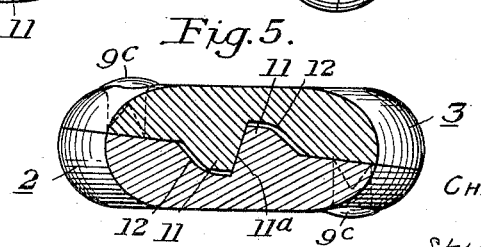
INVENTOR
CHARLES F. REYNOLDS
by his attys.
Stebbins, Blenko + Parmelee Patented Aug. 8, 1939

2,168,539

UNITED STATES PATENT OFFICE 2,168,539

CHAIN REPAIR LINK

Charles F. Reynolds, Cleveland, Ohio, assignor to The Eastern Malleable Iron Company, Naugatuck, Conn., a corporation of Connecticut Application August 26, 1938, Serial No. 226,923

1 Claim. (Cl. 59—87)

This invention relates to a repair link of the type used for making permanent repairs to chains and is particularly applicable to a link of this character made up of malleable castings.

Chain repair links formed of malleable cast iron have heretofore been extensively used. Generally speaking they comprise two identical C-shaped pieces. The continuous side of each piece has a central section which is the full thickness of the link while the end portions of the C generally taper from the thick mid-section to the terminus. When these two sections are put together in face to face relation, the thick mid-portion of each section enters an open space between the ends of the other section while the thinner end portions of the two sections over-lap. When the two sections are thus put together, there is provided a chain link of conventional shape of a substantially uniform thickness of metal at any point in the section of the link. Each of the end portions of the link is provided with a rivet pin projecting from the face thereof, which rivet pin is passed through properly positioned openings in the complementary section and they are riveted over to permanently hold the two sections together. Since the sections are made of malleable cast iron, absolute close fit of the complementary parts is not practical. It has been found in use that when these links are put under strain, the rivet pins invariably shear long before the link is stressed to the danger point.

The present invention has for its object to provide an improvement in links of this character wherein the strength of a cast metal link can be practically doubled without increasing the cross section of the metal employed in the links and with practically no increase in the cost. This is effected through a modification in the shape of the pins. It is further accomplished by the provision of interfitting dowels to make the link stronger in the direction of its long axis and also to hold the end portions of the sections against spreading.

The invention may be readily understood by reference to the accompanying drawing which illustrates one embodiment of my invention and in which—

Fig. 1 is a plan view of one of the two sections of which the link is comprised;

Fig. 2 is a similar view of the other section, and by comparison of the two views it will be noted that the sections are identical;

Fig. 3 is a plan view of the completed link produced by placing the section of Fig. 2 over the section of Fig. 1 in face to face relation;

Fig. 4 is a longitudinal section through the assembled link in the plane of line IV—IV of Fig. 3;

Fig. 5 is a transverse section through the assembled link in the plane of line V—V of Fig. 3;

Fig. 6 is a fragmentary view showing a transverse section across the end portion of one of the sections in substantially the plane of line VI—VI of Fig. 2.

In the drawing the two cooperating or complementary parts comprising a complete link are designated 2 and 3 respectively. Since they are of identical construction, the same reference numbers are used to designate the corresponding parts of each. Each of the sections is substantially the shape of the letter C having a closed side and an open side. The mid-portion of the closed side of each section, designated 4, is of the full cross sectional thickness of the completed link. It is preferably round in cross section. The end portions of the C are designated 5 and 6. At each end of the mid-portion 4 is a sharply sloped shoulder 7. The height of this shoulder is somewhat less than half the thickness of the portion 4. From the base of the shoulder 7 the end portions are of uniform width but of gradually decreasing thickness. The terminal portions 8 have the minimum thickness, this thickness corresponding approximately to the height of the shoulders 7. On the longitudinal leg of each of the sections at each end of the mid-portion 4 and beyond the shoulders 7 are up-standing rivet pins 9. These rivet pins are elongated throughout at least a portion of their full height in a direction parallel with the longitudinal axis of the link. Preferably, the upper portions 9a (see Fig. 4) of these pins are circular while the base portion 9b is elongated in a direction parallel with the axis of the link. Preferably the base portion 9b is in the form of a truncated diamond-shaped pyramid with the long axis of the diamond parallel with the closed leg of the section.

Near each of the terminal portions 8 of each section are openings 10 of a shape conforming substantially to the shape of the pins 9. These openings are generally round in the outer face of the link as indicated at 10a and are extended on the inner faces of the sections into diamond-shaped recesses 10b. The openings 10 are so positioned that when the two sections are placed together in face to face relation, with the portion 4 of one section lying between the terminals 8 of the other section, the pins 9 of one section will register and pass through the corresponding holes of the other section. When the parts are in this position the outer ends of the pins are riveted over as indicated at 9c in Fig. 4.

In addition to the rivet pins 9, the bends in the end portion of the face of each section are provided with up-standing lugs 11. These lugs have a substantially perpendicular face 11a in a plane coinciding with the longitudinal axis of the link. In addition, they have a substantially perpendicular face 11b on the outer portion thereof, best shown in Fig. 6, which face is transverse to the longitudinal axis of the link. The projections or dowels 11 at the opposite ends of each section are on the same side of the longitudinal center line so that the faces 11a are turned in the same direction. The end faces 11b are always toward the outer end of the link. At the base of each of the dowels or projections 11 is a recess 12, the perpendicular face 11a of the projections extending to the bottom of the recesses 12. Each recess 12 has a generally vertical wall portion at 12a for engagement with the face 11b on the projection of the opposite member and each recess is of a depth sufficient to receive the projection of the opposite member.

When the two sections are put together, the faces 11a of the two projections meet in the plane of the longitudinal axis of the link serving to resist any transverse strains in the direction in which the two faces meet. The dowels, particularly with the vertical faces 11b, also serve to resist relative longitudinal movement in the end portions of the two sections when they are together. The elongated formation of the pins materially increases their resistance to strain in the direction in which shearing forces occur, the construction being materially stronger than if the pins are round and of larger diameter. By way of actual illustration, links made of two C-shaped sections having round rivet pins of a dimension corresponding to the links shown in the drawings which show in full size one size of link, have an average resistance on a tensile test machine of 12,408 pounds whereas a link of similar dimensions embodying the present invention will stand an average pull of 22,300 pounds before breaking. While the dimensions of the link are kept exactly the same and the amount of metal in each link is the same and the character of the metal is the same, the strength of the link is practically doubled. If it were practical to closely machine the rivet pins and the holes, round pins would be stronger, but in malleable castings where close accuracy between the interfitting parts is not practical on a production basis, the present invention as applied to cast malleable repair links produced the substantial increase in strength referred to.

While I have illustrated and described one particular embodiment of my invention, it will be understood that changes and modifications may be made therein within the contemplation of my invention and within the scope of the following claim.

I claim:

A repair link for chains comprising complementary cast malleable sections in face to face relation, each section being closed along one side and open at the other, the closed side of each section having a thick middle portion adapted to fill the opening in the other section, each section having end portions which over-lap the corresponding portions of the other section, these end portions being of reduced thickness so that a transverse section through the link in the thick middle portion of the section is substantially the same as the thickness of the link where the two sections over-lap, each of the sections having rivet pins thereon, the over-lapping part of the other section having registering openings through which the pins pass, said pins at their base and throughout a portion of their height being elongated in the direction of the longitudinal axis of the link, each section also having a dowel and a dowel-receiving recess in the end portion on that face which contacts the over-lapping end portion of the other section, the dowel being a projection having a flat face substantially parallel with the longitudinal axis of the link and in substantially the plane of said axis, the dowel having a substantially perpendicular flat face transverse to the longitudinal axis of the link and which resists relative longitudinal movement of the two sections, the dowel-receiving recess being shaped for cooperation with the dowels and being provided with flat wall portions to engage said flat faces.

CHARLES F. REYNOLDS.